United States Patent [19]
Omtzigt

[11] Patent Number: 6,067,643
[45] Date of Patent: May 23, 2000

[54] PROGRAMMABLE OBSERVATION SYSTEM FOR MONITORING THE PERFORMANCE OF A GRAPHICS CONTROLLER

[75] Inventor: E. Theodore L. Omtzigt, Eldorado Hills, Calif.

[73] Assignee: Intel Corporation, Santa Clara, Calif.

[21] Appl. No.: 08/998,417

[22] Filed: Dec. 24, 1997

[51] Int. Cl.[7] .................................................. G06F 11/00
[52] U.S. Cl. ............................ 714/47; 714/37; 714/39
[58] Field of Search ...................... 395/184.01, 183.13, 395/183.15, 183.06, 183.1, 183.11, 568, 835; 702/182, 183, 186, 187; 364/152, 184, 555.01; 714/30, 47, 37, 39, 34, 35; 712/227; 710/15

[56] References Cited

U.S. PATENT DOCUMENTS

| | | | |
|---|---|---|---|
| 5,537,541 | 7/1996 | Wibecan | 395/183.21 |
| 5,581,482 | 12/1996 | Wiedenman et al. | 364/551.01 |
| 5,687,376 | 11/1997 | Celi, Jr. et al. | 395/704 |
| 5,740,409 | 4/1998 | Deering | 395/503 |
| 5,751,945 | 5/1998 | Levine et al. | 395/184.01 |
| 5,752,062 | 5/1998 | Gover et al. | 355/800 |
| 5,835,705 | 11/1998 | Larsen et al. | 395/184.01 |

OTHER PUBLICATIONS

Intel, "Pentium Pro Family Developer's Manual—vol. 3: Operating System W#riter's Guide," pp. viii, 10–1–10–19, B–1–B6, Dec. 1995.

*Primary Examiner*—Robert W. Beausoliel, Jr.
*Assistant Examiner*—Stephen C. Elmore
*Attorney, Agent, or Firm*—Leo V. Novakoski

[57] ABSTRACT

A programmable apparatus is provided that performs real time observation of signals associated with operation of a graphics controller. The apparatus includes a command interface that receives event-monitoring instructions and an observation module that is coupled to resources of the graphics controller. The observation module monitors signals generated by one or more resources in the graphics controller system and processes these signals according to the received event-monitoring instructions.

22 Claims, 10 Drawing Sheets

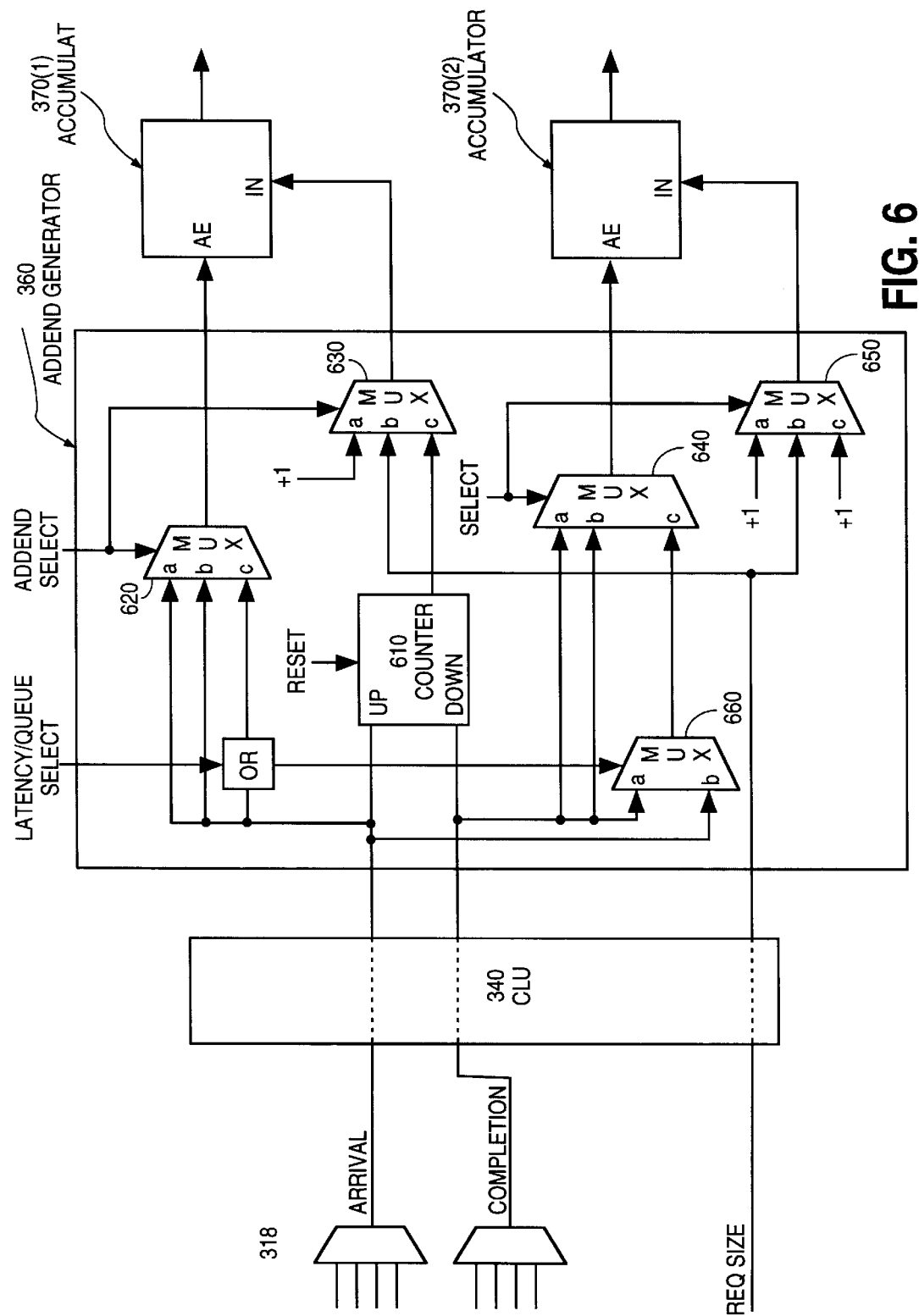

6,067,643

PROGRAMMABLE OBSERVATION SYSTEM FOR MONITORING THE PERFORMANCE OF A GRAPHICS CONTROLLER

RELATED APPLICATIONS

This application is related to U.S. patent application Ser. No. 08/998,088, entitled, Apparatus For Analyzing The Performance of a Computer System, filed on even date herewith and assigned to the same assignee.

BACKGROUND OF THE INVENTION

1. Technical Field

The present invention relates to the field of graphics controllers, and in particular to systems for analyzing the performance of graphic controllers.

2. Background Art

Real-time observations of events/operations within a graphics controller provide useful feedback on the efficiency of the graphics hardware and the software that controls it. Information such as the average number of graphics instructions in a queue, the latency of a specified graphics operation, the frequency of texture cache misses, and the frequency with which a specific graphics resource is stalled may be used by both hardware and software designers to improve system performance. For example, an 80% hit rate on a texture cache may indicate that the cache size needs to be increased, and a relatively high latency for a data transfer between a graphics resource and a graphics surface, e.g. the Z buffer, may indicate a need to modify the channel between them.

In many instances, understanding performance bottlenecks requires relatively complex operations. For example, pinpointing pathological operations may require detecting "handshake" signals between different pairs of graphics resources or concurrent transactions between different pairs of resources. Collisions between these concurrent transactions can indicate device or instruction interactions that are not apparent when monitoring either event separately. Latency experiments must track the time difference between the arrival of a request signal and the completion of the requested action. Where multiple resources share a transaction queue, it may be difficult to disentangle signals for the different resources, and complex analyses of available signals may be required to obtain the desired information.

Currently available methods for monitoring events in graphics hardware are limited by the types of signals that can be observed and the ease with which observations can be made. Logic analyzers are general purpose devices that can be set up to monitor the state of selected external signal lines when a specified instruction is detected. Here, "external signals" refers to those signals that are transferred on a bus or other readily accessible signal line. Details of the instruction, such as its impact on specific resources within the graphics controller, are generally not accessible to these analyzers, and more sophisticated operations, such as detecting concurrent events involving non-external signals, are precluded with logic analyzers. These devices are also relatively expensive and complex to operate, limiting their use to engineers who design and debug the hardware.

Various programmable logic devices (PLDs) can also be used to monitor the operation of system hardware. These are usually designed for specific hardware devices and are complex to use. In addition, PLDs, like logic analyzers only have access to external signals.

There is thus a need for a transparent system capable of monitoring graphics hardware at a sufficiently detailed level to provide meaningful feedback on device performance without need for complex interfacing and analysis procedures.

SUMMARY OF THE INVENTION

The present invention is an apparatus for monitoring a graphics controller to elucidate performance bottlenecks and the like. The system is programmable to perform real time observation of signals associated with operation of the graphics controller.

An apparatus in accordance with the present invention includes a command interface that receives event-monitoring instructions and an observation module that is coupled to the command interface. The observation module monitors signals generated by the graphics controller and processes these signals according to the received event-monitoring instructions.

In one embodiment of the invention, event-monitoring instructions are coupled to the command interface through a command stream controller in the graphics hardware. The observation module may include a co-occurrence logic unit (CLU) for detecting the co-occurrence of specified signals in the computer system. The analysis logic may include an addend generator that is programmable to extract, for example, throughput, bandwidth, and queue depth data from the specified signals.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

FIG. 6 is a circuit diagram of one embodiment of the addend generator of FIG. 3A.

DETAILED DISCUSSION OF THE INVENTION

Figure 1:
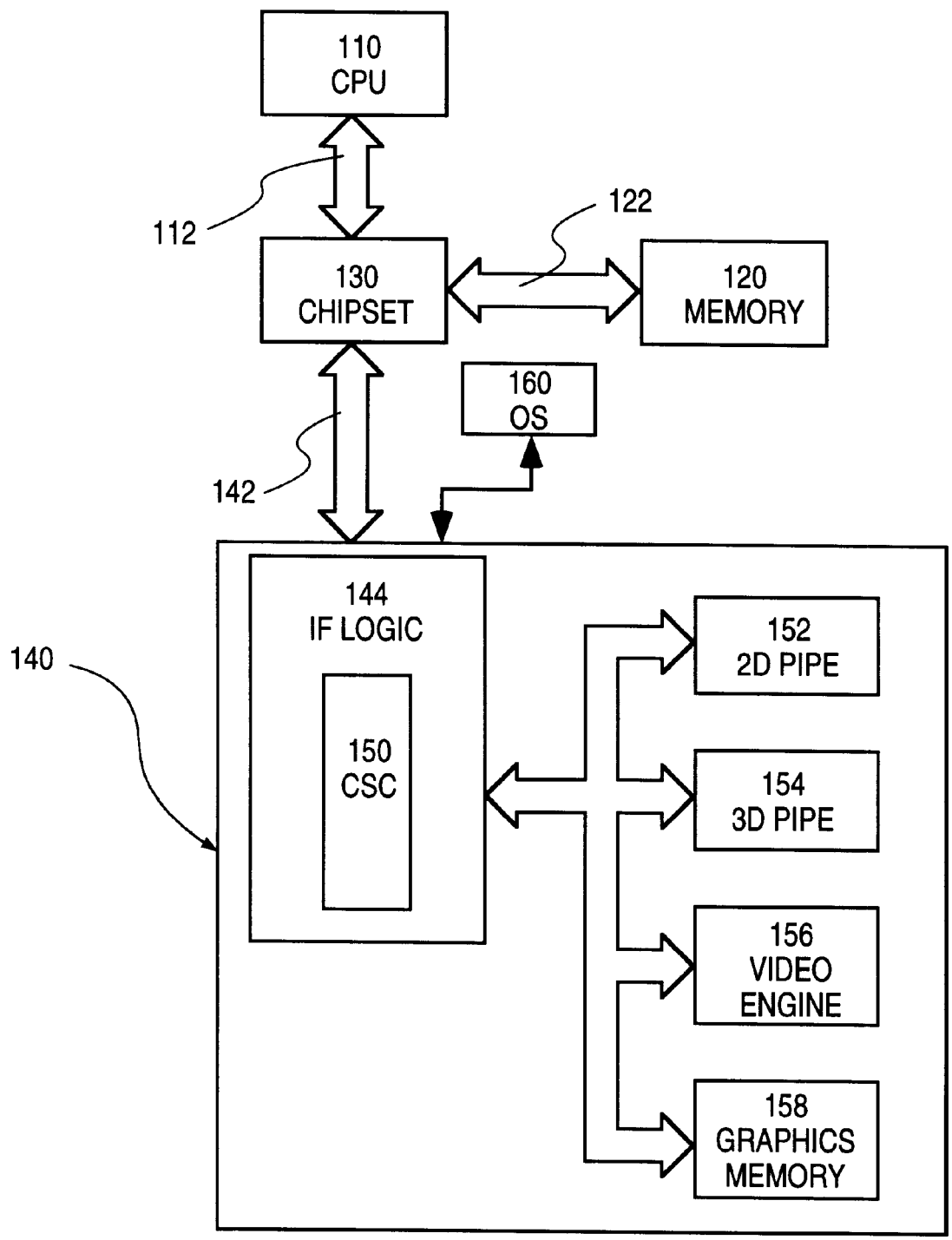
FIG. 1 is a block diagram of a one embodiment of computer system in which the present invention is be implemented.

The following discussion sets forth numerous specific details to provide a thorough understanding of the invention. However, those of ordinary skill in the art having the benefit of this disclosure will appreciate that the invention may be practiced without these specific details. Various well known methods, procedures, components, and circuits have not been described in detail in order to focus attention on the features of the present invention.

The present invention is an observation system for monitoring the performance of a graphics controller through signals generated during operation of the graphics controller. These signals include, for example, pipeline interlock signals that control the flow of data among the resources of the graphics controller. The observation system includes an observation module and a command interface that controls the observation module in accordance with an instruction set architecture (ISA). The command interface generates control signals to components of the observation module in response to event-monitoring instructions of the ISA, and couples data generated by the instructions back to the system.

The observation module monitors signals among the resources of the graphics controller and generates signals (event input signals) that characterize the monitored signals. Selected event input signals are processed to identify user-defined events (event signals), and these events are analyzed to provide higher level information on the system's operation. Event input signals may be generated in response to external signals, such as bus transactions directed to and from the graphics controller (universal signals), as well as in response to signals specific to the particular graphics controller architecture (architecture specific signals).

The observation system may receive event-monitoring instructions directly via memory mapped input/output (I/O) or, when available, through a command stream controller (CSC) in the interface logic of the graphics controller. Routing through the command stream controller allows the instructions to be inserted in a targeted position within a stream of graphics commands. Precise placement of these instructions within the graphics command stream allows the observation system to monitor graphics resources as they respond to the sequence of graphics commands. It also facilitates sampling that is triggered by the occurrence of specified numbers of events of a given type, e.g. event-based sampling. Routing instructions via memory mapped (I/O) allows events to be monitored under a broader range of conditions, which facilitates time-based sampling.

The observation system is described with reference to a generalized graphics controller and its attendant signals. This is done to illustrate the features of the observation system and is not intended to limit the scope of the present invention. For example, in graphics controllers lacking a command stream controller or its equivalent, the observation system may communicate with the system via memory mapped I/O. Similarly, computer system 100 (FIG. 1) is one of many system configurations that may implement a graphics controller suitable for analysis with the present invention and is described for purposes of illustration only.

Referring first to FIG. 1, there is shown a computer system 100 including a graphics subsystem suitable for use with the present invention. Computer system 100 includes a processor 110, a memory 120, chipset logic 130, and a graphics controller 140. Chipset logic 130 couples data among processor 110, memory 120, and graphics controller 140 through buses 112, 122, and 142, respectively.

Graphics controller 140 includes interface (IF) logic 144 for coupling data between its various resources and bus 142. The disclosed embodiment of IF logic 144 includes a command stream controller (CSC) 150 for routing commands to the various graphics resources. These include a 2 dimensional graphics pipeline (2D pipe) 152, a 3 dimensional graphics pipeline (3D pipe) 154, and graphics memory 156. An optional video engine 158 is also shown in the figure.

3D pipe 154 typically includes logic for processing polygons, texture mapping, color blending, and shading. 2D pipe 152 typically includes logic for transferring blocks of data among different sections of graphics memory 158. IF logic 144 also typically includes a controller (not shown) for regulating direct memory access (DMA) transfers between graphics controller 140 and memory 120.

Also shown in FIG. 1 is an observation system 160 in accordance with the present invention for monitoring the performance of graphics controller 140. In the disclosed embodiment, observation system 160 may be accessed through bus 142 via memory mapped I/O or through CSC 150 of IF logic 144.

Figure 2:
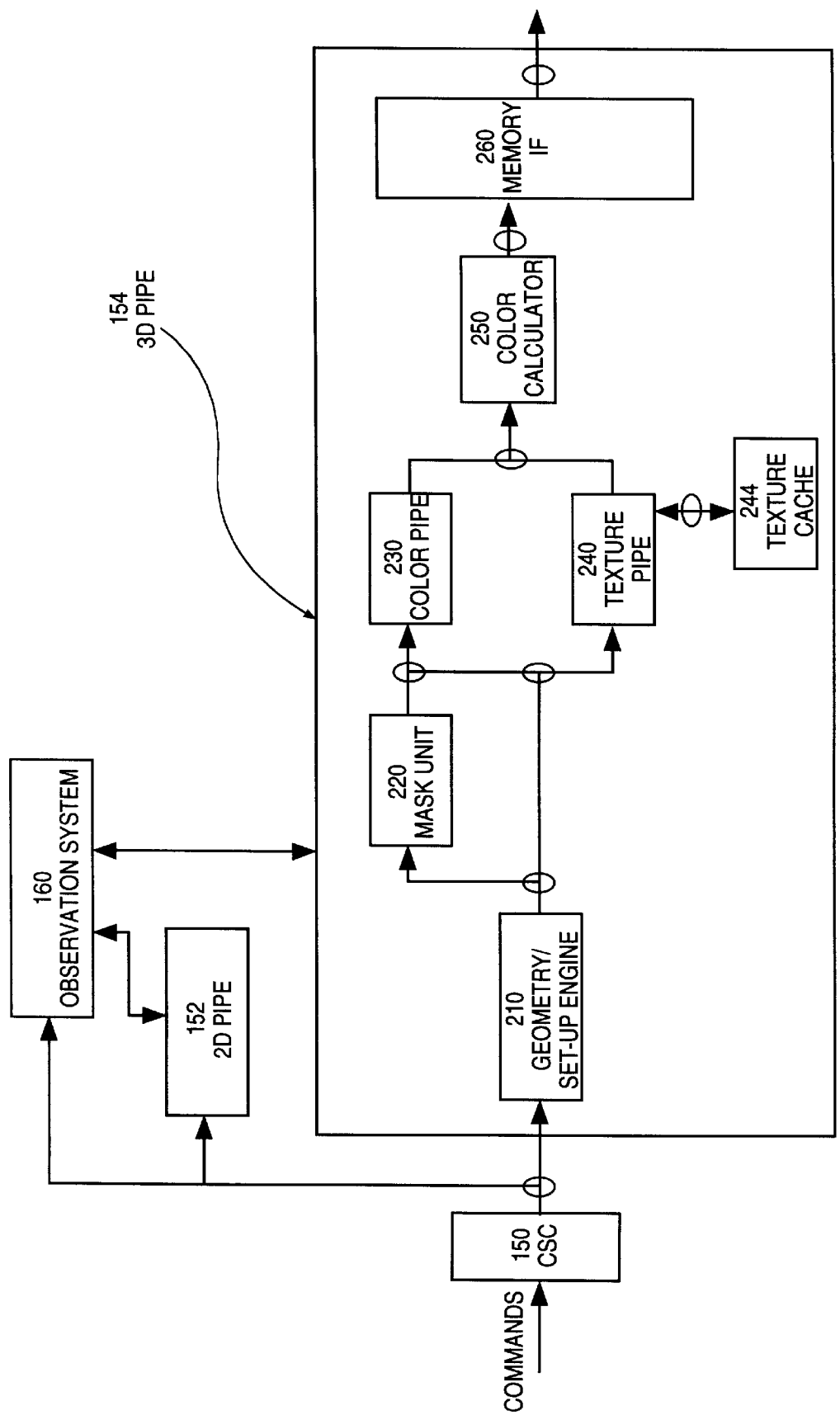
FIG. 2 is a block diagram of one embodiment of a graphics controller suitable for analysis by the present invention.

Referring now to FIG. 2, there is shown a more detailed block diagram of the resources of graphics controller 140 (graphics resources). In the disclosed embodiment, 3D pipe 154 includes a geometry set-up engine 210, a mask unit 220, a color pipe 230, a texture pipe 240, a color calculator 250, and a memory interface 260. Geometry set up engine 210 processes the polygons used to generate 3D images. Mask unit 220 includes logic to select portions of the polygon data provided by set up engine 210 for display. Color pipe 230 includes color interpolation logic that identifies pixels within each polygon and determines the appropriate color and shading for these pixels. Texture pipe 240 includes interpolation logic for mapping texture data onto polygons. A texture cache 244 is also provided for storing texture data. Color calculator 250 processes color data (pixels) and texture data (texels) from color and texture pipes 230, 240, respectively, and couples processed data to various graphics surfaces through memory interface 260.

The different graphics resources coordinate their operations through the exchange of pipeline interlock signals. These include "handshake" signals that control the flow of data between different graphics resources. For example, when geometry set-up engine 210 finishes processing polygon data, it may assert a signal to mask unit 220 indicating that the processed data is ready. Mask unit 220 in turn asserts a signal indicating whether it has capacity to accept the data. When mask unit 220 lacks capacity, set-up engine 210 is stalled and the signal asserted by mask unit 220 to indicates its lack of capacity provides an indication of this condition. On the other hand, mask unit 220 is starved if it signals available capacity while set up engine 210 is busy processing the data, and a busy signal from set up engine 210 provides an indication of this condition. Similarly, color pipe 230 and texture pipe 240 exchange signals with color calculator 250 to indicate the presence and type of data being processed and to determine the availability of color calculator 250 to process the data.

Pipeline interlock signals like those described above are usually generated by interface logic associated with each graphic resource. These signals may be coupled to observation system 160 through dedicated lines or private buses to provide an indication of the status of the various resources. Signals for communicating between components within these graphics resources may also be monitored. Points from which these signals may be accessed by observation system 160 are indicated by ellipses in FIG. 2.

Referring now to Table 1A, there is summarized a sample of pipeline interlock signals or signals that may be derived from them. These signals may be used alone or in combination to specify events for monitoring and analysis. The signals are organized according to the device that receives them.

TABLE 1A

| CSC | Set-Up Engine (SU) | Mask Unit (MU) | Color Pipe (CP) | Texture Pipe (TP) | Texture Cache (TC) | Color Calculator (CC) |
|---|---|---|---|---|---|---|
| CSC starved | SU starved by CSC | MU stalled by CP | CP starved by SU | TP starved by SU | TC data stall | CC stalled by MIF |
| CSC stalled | SU stalled by MU | MU stalled by TP | CP stalled by CC | TP starved by MU | TC RFIFO stall | CC starved by TP |
| | SU start polygon | MU done | CP done | TP done | TC FFIFO stall | CC starved by CP |
| | SU finish polygon | | | | TC miss | |
| | SU done | | | | TC compare | |

In addition to pipeline interlock signals, observation system 160 may monitor other signals that are significant for the operation of graphics controller 140. These include signals coupled to and from graphics controller 140 via bus 142 (universal signals), status signals or flags associated with different graphics resources, and request signals to memory areas of graphics controller 140 (workload signals). Workload signals include, for example, signals exchanged between the various components of texture pipeline 240 and texture cache 244 to retrieve or store required data.

Referring now to Table 1B, there are summarized examples of workload signals which may be monitored and analyzed using the present invention. The first five signals in the first column are arrival signals and the second five are the corresponding completion signals. These signals or their equivalents are present in many graphics controller systems and are discussed in greater detail below.

TABLE 1B

| Signal | Source | Target |
|---|---|---|
| Color Read Req | Mask Unit | Color Pipe |
| Z buffer Read Req. | Mask Unit | Color Pipe |
| Color Write Req. | Color Calculator | Color Pipe |
| Z buffer Write Req. | Color Calculator | Color Pipe |
| Texel Request Arrival | Texture Pipe | Texture Cache |
| Color Read Completion | Color Pipe | Color Calculator |
| Z Buffer Read Completion | Color Pipe | Color Calculator |
| Color Write Completion | Color Pipe | Color Calculator |
| Z Buffer Write Completion | Color Pipe | Color Calculator |
| Texel Request Completion | Memory Interface | Texture Cache |

Event input signals, particularly those generated in response to workload instructions, may be refined by selected qualifier signals. These qualifier signals represent additional information about an underlying transaction or condition, such as the type and amount of data in a request. In addition, certain resource conditions may not be represented by explicit status signals, but the status may be derivable from other signals associated with the resource. Qualifier information is extracted from the underlying resource signals and processed through observation module 320 with a corresponding event input signal. In the disclosed embodiment of observation module 320, event input signals and qualifier signals are combined by CLU 340, as discussed below.

Observation system 160 may be programmed to select event input signals generated in response to any of these signals and process them to analyze specific events in graphics controller 140. These events may be further analyzed by observation system 160 to provide, for example, data on latency, bandwidth, and queue depth for resources in graphics controller 140.

Figure 3A:
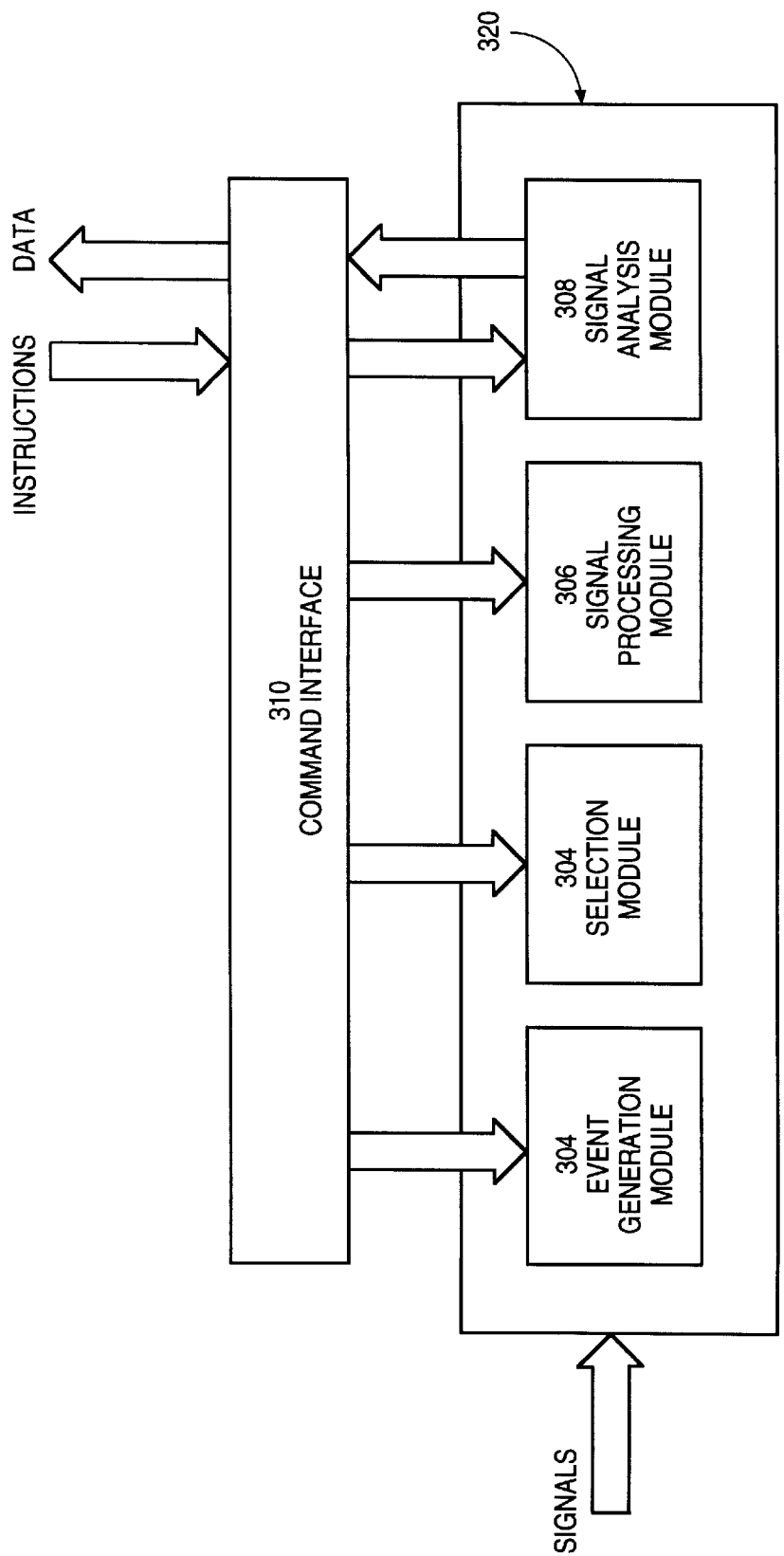
FIG. 3A is a block diagram of an observation system in accordance with the present invention.

Referring now to FIG. 3A, there is shown a block diagram of one embodiment of observation system 160. Observation system 160 includes a command interface 310 that transfers data and instructions between system 100 and an observation module 320. In the disclosed embodiment, command interface 310 receives event-monitoring instructions from bus 142 through memory-mapped registers (not shown) or through CSC 150. Command interface 310 includes circuitry to decode these instructions and generate appropriate control signals for observation module 320. The format of event-monitoring instructions is discussed below.

Observation module 320 includes an event-generation module 302, a selection module 304, a signal processing module 306, and a signal analysis module 308. Event generation module 302 generates event input signals that represent signals detected in graphics controller 140. Selection module 304 is programmable to pass selected event input signals to signal processing module 306. Processing module 306 is programmable to condition event input signals and combine them to define event signals. Analysis module 308 is programmable to analyze event signals to determine frequencies, throughput, bandwidth, and queue depth information for selected event signals.

Figure 3B:
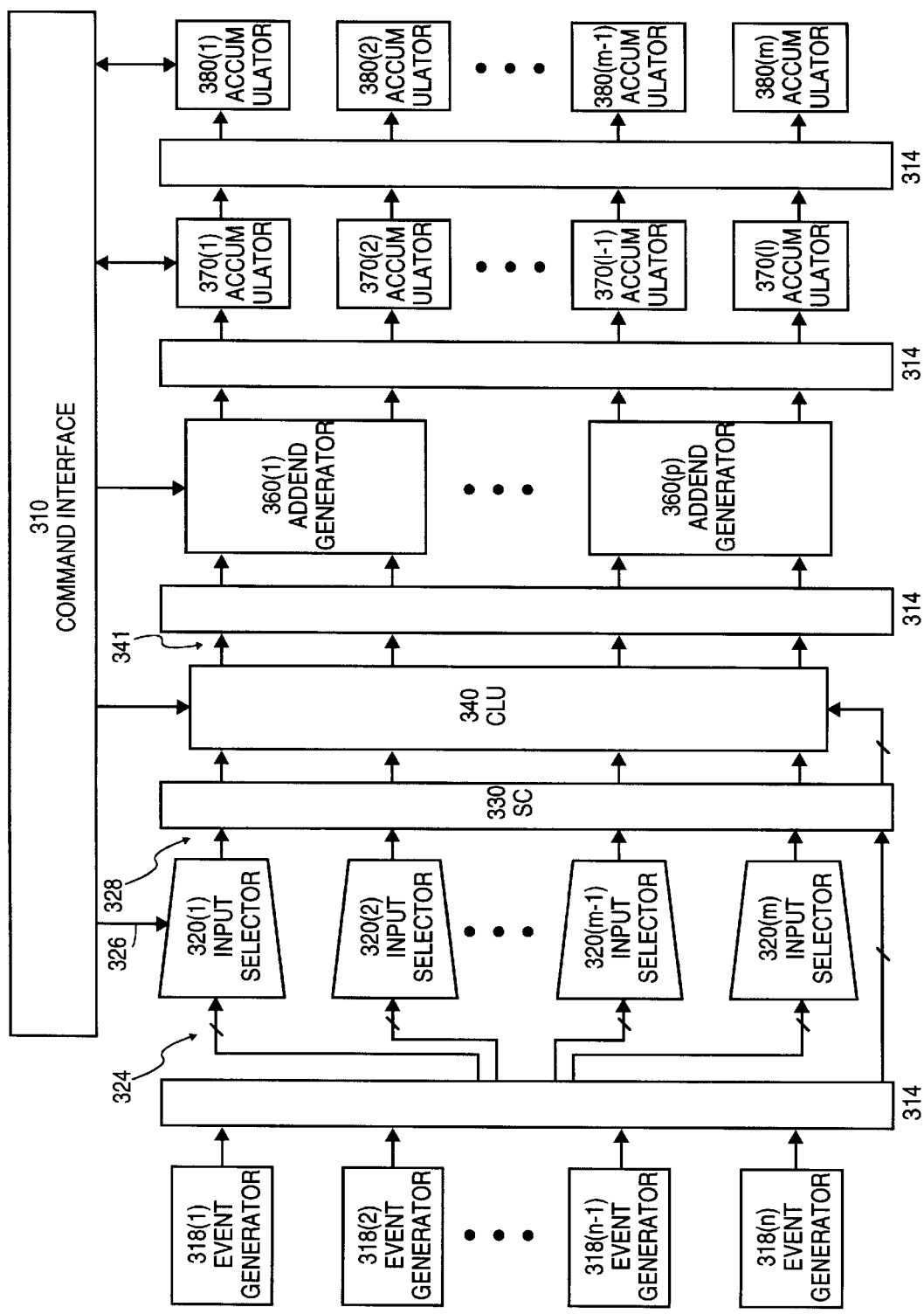
FIG. 3B is a block diagram of one embodiment of the observation system of FIG. 3A.

Referring now to FIG. 3B, there are shown embodiments of the various components of observation module 320 of FIG. 3A. In the disclosed embodiment, event generation module 302 includes one or more event generators 318(1)–318(n) (collectively, event generators 318). Selection module 304 includes one or more programmable input selectors 320(1)–320(m) (collectively, input selectors 320). Processing module 306 includes a signal conditioning (SC) module 330 and a co-occurrence logic unit (CLU) 340, and analysis module 308 includes one or more addend generators 360 and low and high-order accumulators 370, 380, respectively. Vertical blocks 314 represent staging latches.

Event generators 318 are coupled to monitor signals at the various locations indicated in FIG. 2 and produce event input signals that characterize the monitored signals. In the disclosed embodiment, for example, event generators 318(1), 318(2), 318(3) . . . may monitor signals at the locations indicated by ellipses A, B, C, . . . respectively. Monitored signals may be characterized as to their type (starve, stall, cache read, etc.) and, where applicable, the amount and type of data being transferred.

Figure 4:
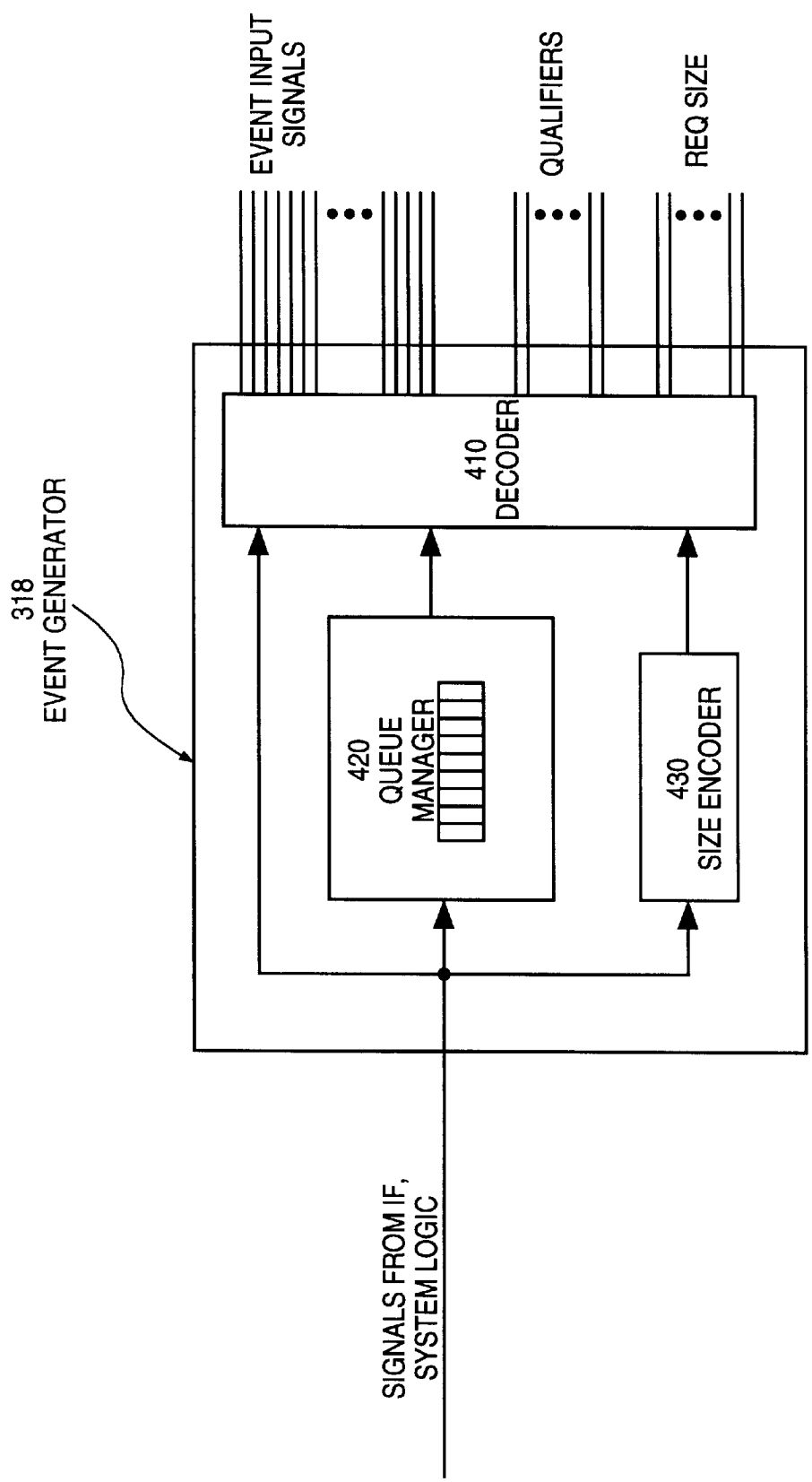
FIG. 4 is a block diagram of one embodiment of the event generator of FIG. 3B.

Referring now to FIG. 4, there is shown a block diagram of one embodiment of event generator 318. In the disclosed embodiment, event generator 318 includes a decoder 410, a request queue manager 420, and a size encoder 430. Decoder 410 translates signals detected at an associated location of graphics controller 140 into corresponding event input signals. Where applicable, size encoder 430 determines the size of a data block being transferred. Request queue manager 420 tracks the status of various outstanding transactions and generates corresponding status signals where appropriate.

In the disclosed embodiment of event generator 318, decoder 410 processes signals, where appropriate, to determine the size of data blocks transferred in a graphics transaction. Alternative embodiments of observation module 320 may include a separate remapping module to generate this type of data size information.

Selection module 304 determines which event input signals are passed to processing and analysis modules 306 and 308, respectively, for event analysis. The disclosed embodiment of selection module 302 (FIG. 3B) includes one or more input selectors 320. Each input selector 320 includes a plurality of inputs and each input is coupled to receive a selected event input signal from a corresponding event generator 318. A control input 326 transfers the signal on a selected input to processing module 304, according to an event-monitoring instruction at command interface 310. Input selectors 320 may be paired to pass selected pairs of event input signals, and selected signals may be modified by conditioning module 330. Such pairing/conditioning facilitates bandwidth, queue depth, and latency experiments.

Signal conditioning module 330 is programmable to perform logical operations on the selected event input signal(s) or convert the selected signal(s) into a format suitable for use by later stages of observation module 320. In one embodiment of the invention, signal conditioner 330 supports no operation (NOP), invert, one-shot, and inverted one-shot operations on event input signals. These operations may be implemented using, for example, a one-shot mono-stable flip flop.

CLU 340 receives (conditioned, qualified) event input signals and generates event signals when selected combinations of the (conditioned, qualified) event input signals are asserted. The selected combinations of event input signals represent transactions or events of interest in graphics controller 140. Because event signals can be generated by refining, conditioning, and combining various event input signals, they can represent events that are more complex and more fully specified than those represented by any of the monitored signals alone.

In one embodiment of CLU 340, event signals are specified as Boolean functions of the event input signals whose combinations represent the events of interest. The Boolean combinations of event input signals are specified through event monitoring instructions. In one embodiment of CLU 340, an event signal is asserted when the Boolean function representing the vent of interest is true. In addition, each event input signal may be combined with one or more qualifiers associated with the underlying transaction/condition, to further specify the event being monitored. Qualified event input signals may be combined to represent an event of interest, e.g. transaction collision, more precisely.

For example, an event of interest may be a texture cache miss during pixel processing. Tracking and analysis of this event may indicate the need for changes to texture pipe 240, such as increasing the size of texture cache 244. This event can be specified by concurrent assertion of a texture cache miss pipeline interlock signal (TC miss=SigA) and color write requests workload signal (Color Write Req.=SigB). A co-occurrence event-monitoring instruction specifies this event to CLU 340 as SigA AND SigB, and an event select instruction programs a pair of selectors 320 to couple event input signals representing SigA and SigB to processing module 306. The event input signals are coupled through signal conditioner 330 to CLU 340, which asserts a corresponding event signal when SigA and SigB are asserted concurrently. If only those color write requests of, for example, more than 32 bytes are of interest, SigB may be ANDed with a data size qualifier, and the qualified SigB ANDed with SigA by CLU 340.

Figure 5A:
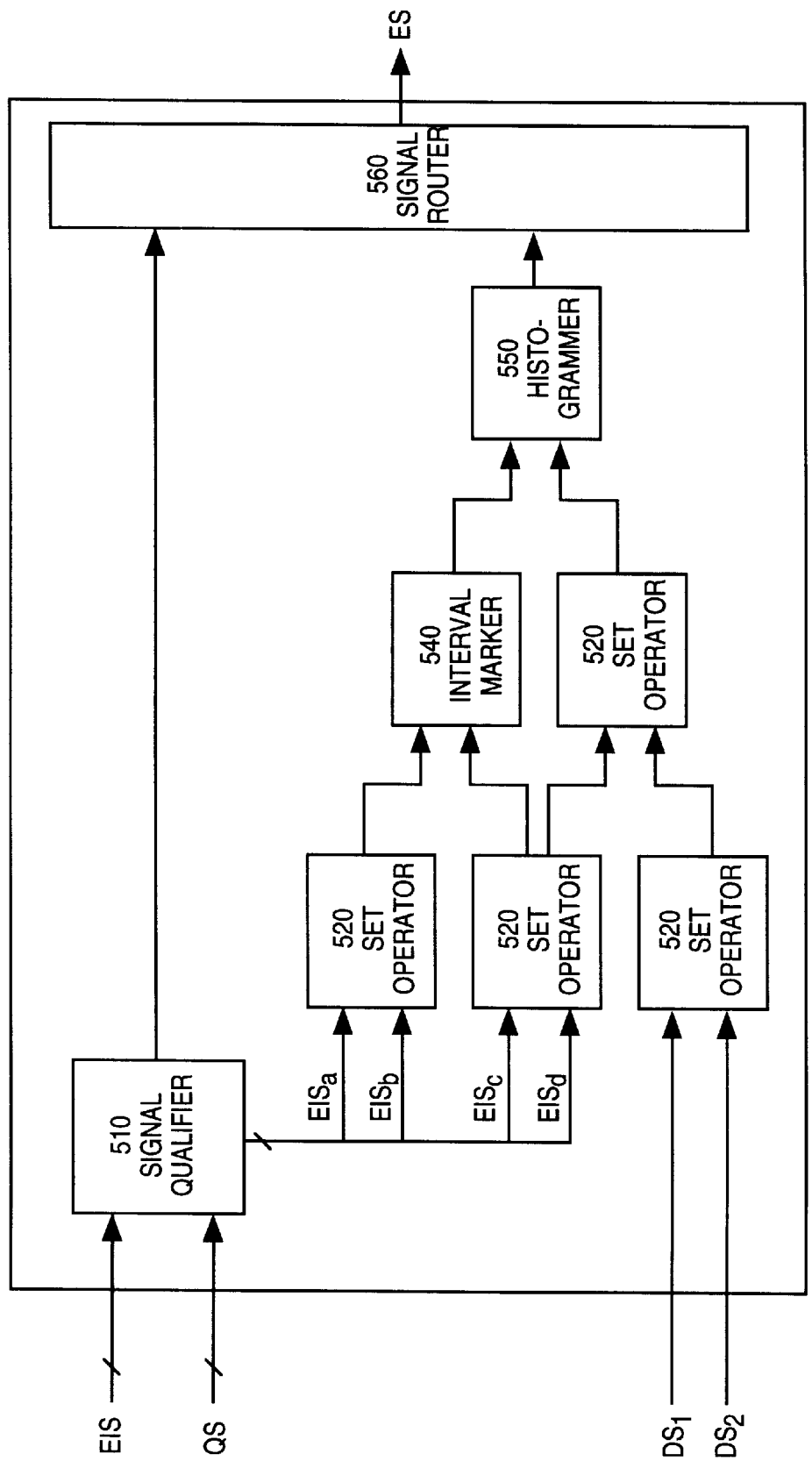
FIGS. 5A, 5B are block diagrams of one embodiment of the co-occurrence logic unit of FIG. 3B.

Referring now to FIG. 5A, there is shown block diagram of one embodiment of CLU 340. In the disclosed embodiment, CLU 340 includes a signal qualifier 510, set operators 520(a)–520(d) (collectively, set operators 520), an interval marker 540, a histogrammer 550, and a signal router 560. Signal qualifier 510 includes circuitry for combining an event input signal (EIS) with a qualifier signal (QS) to generate a qualified EIS (QEIS). In its simplest form, signal qualifier 510 may be an AND gate with QS and EIS applied to its inputs. QEIS may be provided to signal router 560 for coupling to analysis module 308, or it may be provided to a set operator 520, for combination with another EIS or QEIS.

Set operators 520 are programmable to generate signals representing Boolean combinations of signals applied to their inputs. In the disclosed embodiment, CLU 340 is shown with four 2-input set operators 520, although additional set operators may be included to provide greater functionality. Set operators 520(b), 520(c), 520(d) are coupled to generate Boolean combinations of up to 4 signals. In addition, interval marker 540 is coupled to receive input signals from set operators 520(a) and 520(b) and indicate the interval between assertion of the two input signals. In this embodiment, interval marker 540 is a one bit state machine that asserts an output signal when one of its input signals is asserted and deasserts the output signal when its other input signal is asserted.

Histogrammer 550 includes a counter and a comparator to sort signals at its input into defined intervals In the disclosed embodiment, histogrammer 550 may be driven by the output of either set operator 520(d) or interval marker 540. Accordingly, it may be used to track the duration of events specified by set operators 520(b), 520(c), 520(d) or intervals between events specified by set operators 520(a) and 520(b).

Figure 5B:
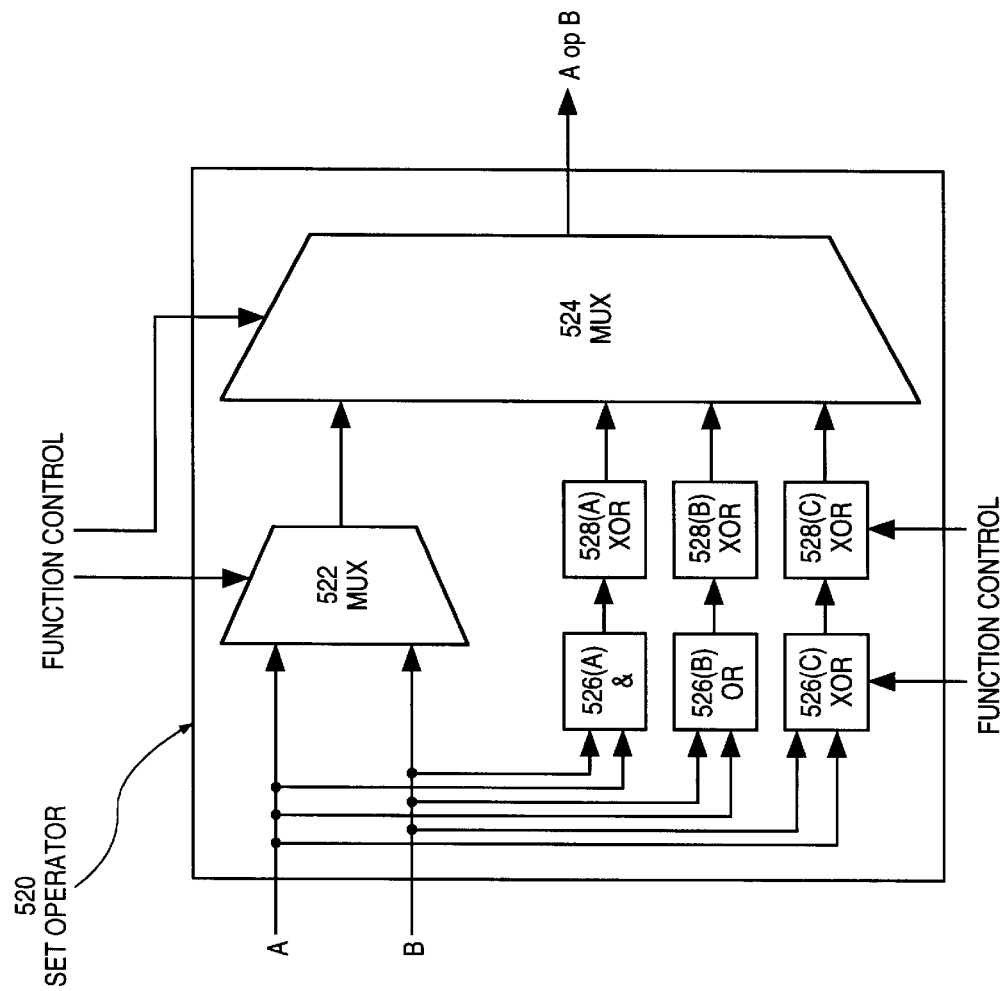

Referring now FIG. 5B, there is shown a block diagram of an embodiment of set operator 520. Set operator 520 comprises multiplexers 522, 524, XOR logic gates 526(a)–526(c) (collectively, XORs 526), as well as AND gate 528(a), OR gate 528(b), and XOR gate 528(c) (collectively, logic gates 528). Multiplexers 522, 524, XORs 526 and logic gates 528 are programmable through function control signals generated by command interface 310. For example, the event signal representing $EIS_C$ OP $EIS_D$ is asserted when (conditioned, qualified) event input signals $(Q)EIS_C$ and $(Q)EIS_D$ make the logic equation true. The disclosed embodiment of set operator 520 can generate event signals representing $(Q)EIS_C$ and $(Q)EIS_D$ individually, as well as Boolean combinations of these EISs, where OP is AND, NAND, OR, NOR, XOR, XNOR.

DS represents duration signals. These are level triggered signals that remain in a specified state as long a specified condition is true. EIS signals, on the other hand, are typically pulsed signals that change state temporarily when an associated event occurs.

Event signals from processing module 306 may be further processed by analysis module 308 of observation module 320. In the disclosed embodiment, analysis module 308 includes addend generators 360 and accumulators 370, which may be programmed to track occurrences of selected event signals or perform experiments based on selected event signals. Accumulators 370 are shown coupled to higher order accumulators 380, respectively, in a pipelined configuration. This allows tracking of event data at higher rates than is possible for single stage accumulators, but it is not required for the present invention.

Addend generators 360 and accumulators 370,380 allow observation module 320 to simultaneously accumulate data on multiple event signals. Information on, for example, the queue depth at registers in selected resources and the latency of selected operations implemented by these resources may be determined from differences between selected arrival and completion events. Event input signals in table 1B (and some in table 1A) may serve to indicate either arrival (a) or completion (c) events. Arrival events include, for example, signals indicating receipt of read and write requests at queues associated with various resources in graphics controller 200. The corresponding completion events include signals indicating completion of the read and write requests, e.g. receipt of requested data or data successfully transferred to the target resource.

Queues associated with resources in graphics controller 140 typically service multiple resources. Accordingly, latency and queue depth data is extracted by monitoring arrival and completion events in the queue of interest over a selected interval. For example, the average latency (S) of request is given by:

$$s = \frac{\sum_i (A - C)}{C}$$

Here, A and C are the number of arrivals and completions, respectively, that have occurred during an observation interval, T. The difference between A and C is accumulated on a per clock cycle (i) basis to yield the busy time B during T. C is a running count of the number of completions during T.

Observation system 160 generates latency data by tracking arrival and completion events, determining the difference between stored values on each clock cycle, summing the difference (busy time) in a first accumulator 370, and summing the number of completions in a second accumulator 370. The busy time may also be used to determine the average queue depth for a resource by tracking the number of arrival event signals in the second accumulator. Bandwidth data may be generated by tracking the size of arriving data transactions in first accumulator 370 and the number of arrivals in second accumulator 370.

Referring now to FIG. 6, there is shown one embodiment of addend generator 360 that is programmable to implement the above described latency, queue depth, and bandwidth experiments. Also shown is the coupling between addend generator 360, CLU 340 and accumulators 370.

Addend generator 360 includes an up/down counter for tracking the number of outstanding requests in the system. These requests are represented by arrival and completion event signals applied to inputs UP, DN. MUXs 620, 630, 640, 650 are programmable to couple various event signals, including those driving UP, DN inputs of counter 610, to accumulators 370. In the disclosed embodiment, the event signals are shown as arrival and completion event signals provided through a pair of input selectors 318(1), 318(2). These signals are used to illustrate latency and queue depth experiments with the understanding that other event signals, e.g. event input signal combinations defined using CLU 340, may be similarly analyzed or accumulated by addend generator 360 and accumulators 370.

MUXs 620 and 640 couple selected event signals to enable accumulators 370(1), 370(2), respectively, via inputs AE. MUXs 630 and 650 couple signals selected to be tracked to data inputs (IN) of accumulators 370(1), 370(2), respectively. Control inputs of MUXs 620, 630, 640, 650 are coupled to a control signal, which selects the various input signals according to a type of experiment to be run. A MUX 660 selects one of the event signals input to MUX 640.

In the disclosed embodiment, different event signal analyses are triggered by a select signal (ADD_SEL) applied to MUXs 620, 630, 640, and 650. For example, if the a-inputs of MUXs 620, 630, 640, 650 are selected, events A and C are tracked in accumulators 370(1) and 370(2), respectively. If the b-inputs of MUXs 620, 630, 640, and 650 are selected, data sizes transferred by A events are tracked in accumulator 370(1) and the number of A events are tracked in accumulator 370(2). This data can be used to provide bandwidth data for A events.

The latency of an operation initiated by an event A and completed by an event C may be determined by selecting c-inputs of MUXs 620, 630, 640, 650 and a-input of MUX 660. In this case, accumulator 370(1) tracks outstanding requests or busy time (the difference between number of A and C events), while accumulator 370(2) tracks C events. The latency is provided by the ratio of the busy time for an interval to the number of completions during the interval. If b-input of MUX 660 is selected instead, accumulator 370(2) tracks A events, which can be combined with the busy time (accumulator 470(1) to indicate the queue depth.

Addend generator 370 thus provides programmable structures for manipulating event signals defined by input selectors 318 and, if necessary, CLU 340. Alternative embodiments of observation module 320 may employ different logic combinations for analyzing event output signals from CLU 340. For example, counters and subtraction logic may be used in conjunction with accumulators 370, 380 to further analyze event output signals.

Figure 7:
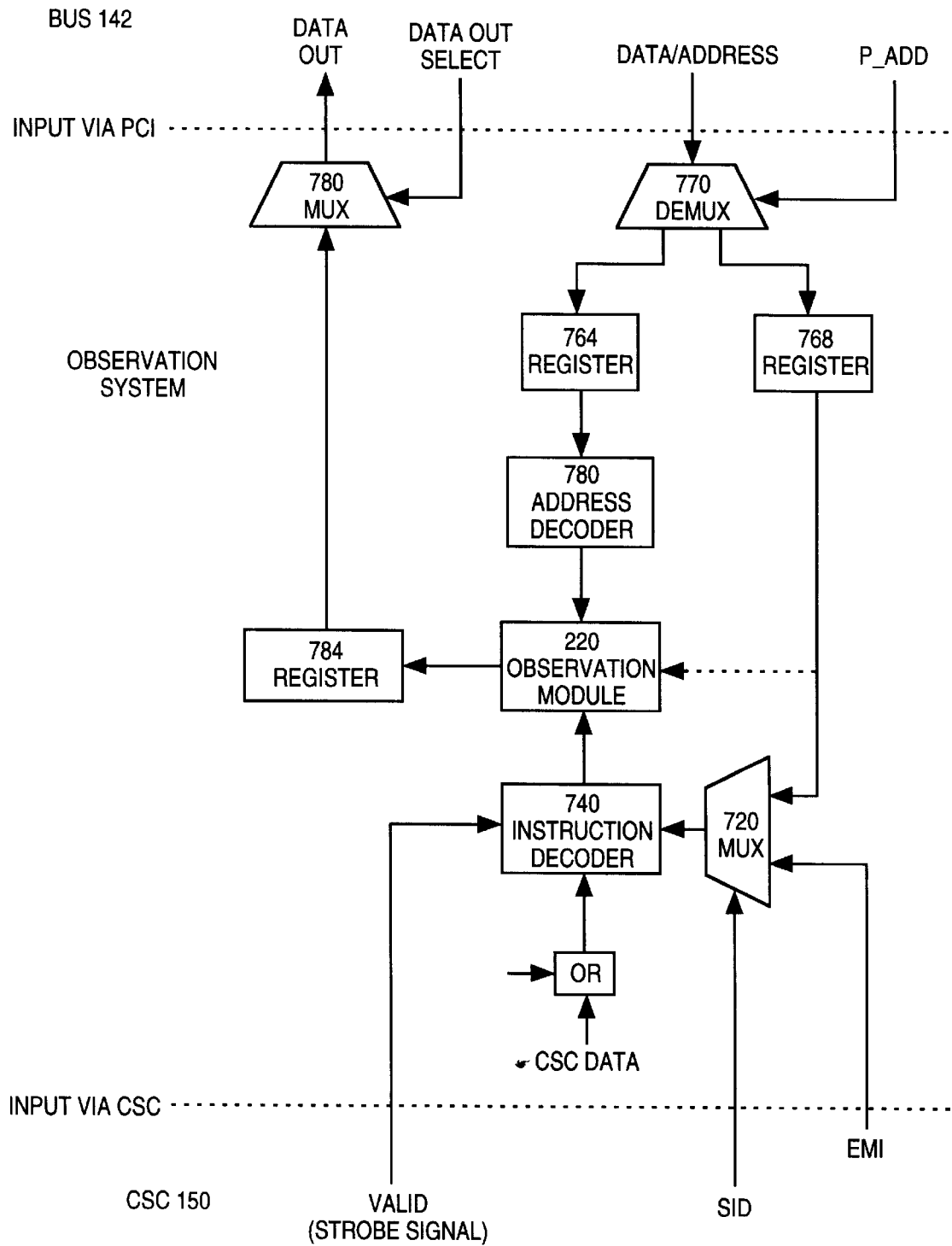
FIG. 7 is a block diagram of one embodiment of the command interface of FIGS. 3A, 3B.

Referring now to FIG. 7, there is shown an embodiment of command interface 310 for receiving event-monitoring instructions and generating appropriate control signals to the components of observation module 320. A first interface couples instructions and related data from CSC 150 to observation module 320, and a second interface couples instructions and related data between observation module 320 and bus 142. While the disclosed embodiment of command interface 310 allows communications with observation module 320 through CSC 150 and bus 142, alternative embodiments may support only one of these sources of event-monitoring instructions.

The signals coupled through the first interface include a source identity signal (SID), an event-monitoring instruction (EMI), and a strobe signal. SID is asserted or deasserted according to whether the EMI is being provided through the first interface (via CSC 150) or the second interface (via bus 142), respectively. EMI includes fields (FIGS. 5A–5D) that indicate the type of operation to be performed by observation module 322 and the components of observation module 320 involved. The strobe signal indicates when the SID and EMI are valid.

Instructions from CSC 150 are coupled to one input of a multiplexer (MUX) 720, another input of which is coupled to receive instructions from the second interface. A control input of MUX 720 is coupled to receive SID. MUX 720 couples the data (EMI) from the input indicated by SID to an instruction decoder 740. Instruction decoder 740 includes logic that generates control signals to the components of observation module 320 as indicated by EMI. These signal may, for example, reset counter 350 (RESET), couple one of inputs 324 of selector 322 to signal conditioner 330 (EVENT SELECT), or identify to CLU 340 one or more signal combinations to be coupled to counters 350 (SET_CO-OCCURENCE). Instruction decoder 740 is triggered whenever a new command is detected at the first or second command interfaces.

In one embodiment of command interface 310, CSC 150 provides 32-bit event-monitoring instructions to the first interface in 16-bit segments. In this case a demultiplexer and register (not shown) are used to concatenate the 16-bit segments into a 32-bit instruction before routing it to MUX 720.

The second interface couples observation module 320 to bus 142 for memory mapped I/O. In the disclosed embodiment, the second interface receives data from bus 142 and couples data from observation module 320 to bus 142. A MUX 770 routes data from bus 142 to an address register 764 or an instruction register 768 according to the state of a signal (P_ADD) applied to its control electrode. Data from bus 142 may include address data and EMIs. For example, the processor of system 100 may use memory mapped I/O to deliver event-monitoring instructions to observation interface 310 via bus 142.

Address data from bus 142 is routed to address register 764, where it is decoded to determine whether data on bus 142 is intended for observation module 320. Data addressed to observation module 320 is typically an event-monitoring instruction, which is provided to instruction decoder 740 through MUX 720.

Data generated by observation module 320, such as bandwidth, latency, or event frequency information, is provided to bus 142 through MUX 780. In the disclosed embodiment, this data may be buffered in a register 784 and latched to bus 142 by a signal applied to the control input of MUX 780. Generally, addresses and instructions provided through memory mapped I/O, and instructions provided through CSC 150 are buffered in registers 774, 778, and 724, respectively.

A basic set of event-monitoring instructions suitable for programming observation system 160 are summarized in Table 2. This table indicates the arguments specified in each instruction and the purpose (use) of the instruction. These instructions are discussed below in conjunction with FIGS. 8A–8D.

TABLE 2

| | INSTRUCTION | ARGUMENT(S) | USE |
|---|---|---|---|
| 1 | Reset | resource-list | synchronous reset of addend generators/accumulators |
| 2 | Start/Stop | resource-list | start & stop addend generator/accumulator |
| 3 | Sample | resource | sample addend generator/accumulator |
| 4 | Sample & Reset | resource | sample & reset addend generator/accumulator |
| 5 | Sample & Stop | resource | sample addend generator/accumulator & inhibit |
| 6 | Sample Overflow | overflow bits | sample the overflow bits |
| 7 | Set Sample | resource | set the sample register to shadow the OS data register |
| 8 | Set_Event_For_Selector | monitored signal(s) | set-up input signal selector & associated signal conditioner |
| 9 | Set_Co-Occurrence | CLU register & value | set up CLU (function control inputs) |
| 10 | Set_Addend | addend selectors, latency/queue bits | set up addend selectors (MUXs 620, 630, 640, 650, 660) |
| 11 | Set_Latency_Experiment | latency selector pair, signal conditioning, event | set up latency experiment |
| 12 | Set_Queue_Experiment | queue selector pair, signal conditioning, event | set up queue experiment |
| 13 | Set_Bandwidth_Experiment | bandwidth group signal | set up bandwidth experiment |

Figure 8A:
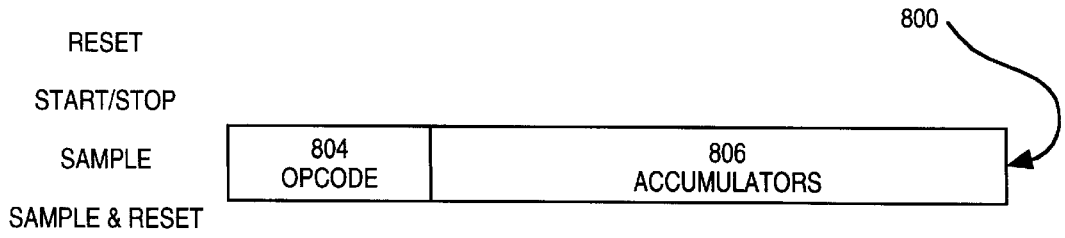
FIGS. 8A–8D are block diagrams representing selected event-monitoring instructions for use with the present invention.

Referring now to FIG. 8A there is shown a block diagram of an EMI 800 suitable for instructions 1–7 of Table 2. This instructions controls accumulators 370, 380 of observation system 300 and includes an operation code (Opcode) field 804 and an accumulator field 806 for this purpose. Opcode field 804 indicates which of instructions 1–7 is being executed, while accumulator field 806 indicates the targeted accumulator. For example, A Reset instruction resets the indicated accumulator(s) to a starting value, which is typically zero. Sample & reset causes the contents of the indicated accumulator(s) to be read and the accumulator(s) reset. Sample causes the contents of the indicated accumulator(s) to be sampled without resetting.

Figure 8B:
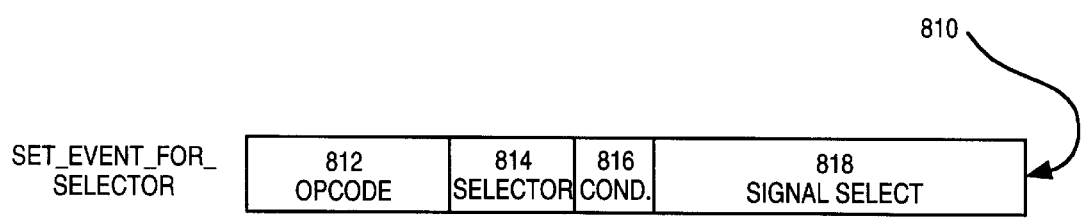

Referring now to FIG. 8B, there is shown a block diagram of a Set_Event_Instruction (SEI) 820. SEI 820 indicates which event input signals are to be tracked. Opcode field 812 identifies the type instruction, i.e. SEI. A selector address field 814 indicates which selector 320 is being used, while a signal select field 818 indicates which input of the selector is to be coupled to processing logic 306. In one embodiment of the invention, signal select field 818 includes a group-select sub-field and a signal-select sub-field to indicate a general group of signals and a specific signal in the signal group, respectively. Instruction decoder 740 of command interface 310 converts data in signal select field 818 into an appropriate control signal for selector 320. A condition field 816 indicates any logical or other types of operations to be performed on the selected event input signal by signal conditioner 330.

Figure 8C:
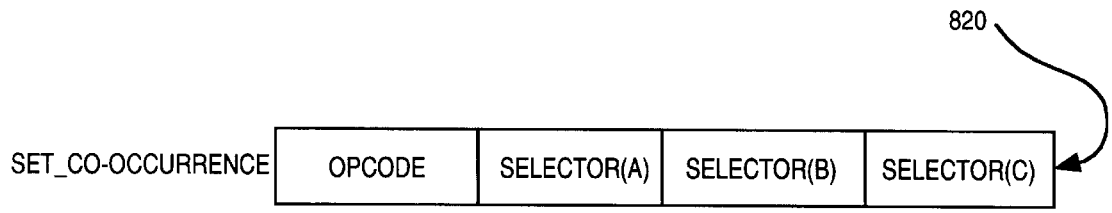

Referring now to FIG. 8C, there is shown a block diagram of a Set_Co-occurrence instruction (SCI) 820, suitable for setting up CLU 340 to detect selected signal combinations. SCI 820 includes an opcode field 822, a register address field 824, and a register value field 828. Opcode field 822 indicates to decoder 740 the instruction type (SCI). Register address field 824 identifies a register associated with one of the resources of CLU 340, e.g. set operators 520, signal qualifier 510, for programming the resource. Register value field 828 includes a value that encodes, for example, a selected Boolean operation to be implemented by the identified resource. This value is written to the identified register to program the associated resource.

Figure 8D:
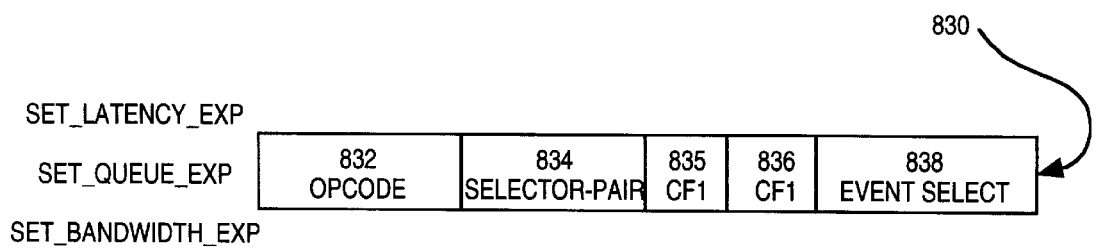

Referring now to FIG. 8D, there is shown a block diagram of a Set_X_Experiment instruction (SXI) 840, where X refers to various experiments that are specified using the same data format, e.g. instructions 11–13 of Table 2. In the disclosed embodiment, X may indicate a latency experiment, a queue depth experiment, or a bandwidth experiment. In each case, SXI 830 includes an opcode field 832, a selector-pair field 834, conditioning fields 836, 837, and an event select field 838. Opcode field 832 identifies the instruction type (SXI) to decoder 740. Selector field 834 indicates a set of input selectors 322 that receive the targeted event input signals, and event select field 838 indicates the specific inputs of the indicated input selectors 322 that receive the targeted event input signals. These event input signal pairs may be selected from a list of encoded signal pairs.

In a latency experiment, for example, one selector 320 of the pair will be programmed to select an event input signal representing an arrival event, while the other selector 320 of the pair will be programmed to select an event input signal representing a completion event. In a bandwidth experiment, one selector 320 of the pair will select an event input signal and the other selector 320 will select a data signal that provides information on the data block size transferred by the associated event. In the disclosed embodiment of observation system 160, this data block information is provided by the size encoder of event generator 318. Conditioning fields 846, 847 indicate any conditioning, e.g. unary logic operations, to be applied to the selected event input and data block signals.

There has thus been provided an observation system for monitoring and analyzing the performance of a graphics controller. The system includes a command interface and an observation module that is coupled to receive signals from various resources of the graphics controller. The command interface controls logic in the observation module to select and processes signals according to event monitoring instructions.

What is claimed is:

1. A system for monitoring operation of a graphics controller, the system comprising:
   a command interface coupled to receive event-monitoring instructions;
   a signal generation module coupled to the graphics controller to generate an event input signal when a corresponding signal is detected in the graphics controller;
   a signal selection module coupled to the command interface and the signal generation module to select an event input signal according to the event monitoring instruction;
   a signal conditioner programmable by the event monitoring instruction to perform unary operations on the selected event input signal; and
   a co-occurrence logic unit (CLU), programmable by the event monitoring instruction to detect a selected combination of one or more selected event input instructions and generate an event signal when the selected combination is detected.

2. The system of claim 1, further comprising an analysis module coupled to the command interface and the CLU to track selected event signals in accordance with an event monitoring instruction.

3. The system of claim 1, wherein the CLU is programmable to detect event input signals occurring in a specified Boolean relationship.

4. The system of claim 1, wherein the graphic controller includes a command stream controller for routing instructions received by the graphics controller and wherein the command interface is coupled to the command stream controller for receiving event-monitoring instructions through the graphics controller.

5. The system of claim 1, wherein the command interface is coupled to receive commands through an I/O address written by a processor.

6. The system of claim 5, wherein the data interface includes a decoder to route event data to an indicated accumulator for analysis.

7. The system of claim 1, wherein the command interface includes an instruction decoder for decoding event-monitoring instructions.

8. The system of claim 1, wherein the observation module is coupled to the graphics controller through a data interface.

9. A system for monitoring the performance of a graphics controller, the system comprising:
   an instruction decoder for processing an event-monitoring instruction;
   a data interface coupled to the graphics controller for receiving a signal from the graphics controller indicating an operation by one or more resources in the graphics controller;
   an event generator coupled to the data interface to generate an event input signal when a selected signal from the graphics controller is received;
   a processing module for generating an event input signal in response to receipt of one or more event input signals in a specified combination; and
   an input selection module, coupled to the event generator and the processing module, to couple the one or more event input signals to the processing module responsive to signals from the instruction decoder.

10. The system of claim 9, further comprising an analysis module coupled to track one or more event signals from the processing module responsive to the event monitoring instruction.

11. The system of claim 10, wherein the analysis module comprises:
    one or more accumulators; and
    an addend generator coupled to the one or more accumulators and the instruction decoder to route event signals to the one or more accumulators responsive to an event monitoring instruction processed by the decoder.

12. The system of claim 9, wherein the signal from the graphics controller is a pipeline interlock signal.

13. The system of claim 9, wherein the signal from the graphics controller is a workload signal.

14. A system for analyzing the performance of a graphics controller, the system comprising:
    a graphics controller including resources that communicate via internal signals;
    a command interface coupled to receive event monitoring instructions and generate control signals responsive to the received instructions;
    an observation module coupled to the graphics controller and the command interface to process selected internal signals from the graphics controller to identify events according to control signals provided by the command interface, the observation module including an analysis module that is programmable through the command interface to track selected events in the graphics controller to provide performance information on the graphics controller.

15. The system of claim 14, wherein the graphics controller includes a command stream controller for routing commands to various resources and the command interface is coupled to receive event monitoring instructions through the command stream controller.

16. The system of claim 14, wherein the performance information includes event frequencies, queue depths, operation latencies, and bandwidth information.

17. A computer system comprising:
 a central processor to issue graphics commands and event monitoring instructions;
 a graphics controller to implement graphics operations, responsive to the issued graphics commands; and
 an observation system associated with the graphics controller, the observation system including:
  a command interface to decode the issued event monitoring instructions and generate control signals according to the received instructions; and
  an observation module coupled to the command interface to detect selected signals associated with the graphics operations and to process the selected signals, responsive to the control signals.

18. The computer system of claim 17, wherein the observation module includes an analysis module that tracks selected events in the graphics controller, responsive to the control signals, to provide performance information on the graphics controller.

19. The computer system of claim 17, wherein the observation module includes a co-occurrence logic unit to identify combinations of signals associated with the graphics operations, the identified combinations being specified through the event monitoring instructions to define an event.

20. The computer system of claim 19, wherein the observation module includes an analysis module that is programmable to monitor defined events to provide performance information on the graphics controller.

21. The computer system of claim 17, wherein signals associated with the graphics operations includes pipeline interlock signals and workload signals, and the observation module is programmable to detect occurrences of one or more pipeline interlock and workload signals.

22. The system of claim 17, further comprising a command stream controller to receive graphics commands and event monitoring instructions from the processor and route them to the graphics controller and the observation system, respectively.

* * * * *

UNITED STATES PATENT AND TRADEMARK OFFICE
CERTIFICATE OF CORRECTION

PATENT NO. : 6,067,643
DATED : May 23, 2000
INVENTOR(S) : Omtzigt

It is certified that error appears in the above-identified patent and that said Letters Patent is hereby corrected as shown below:

Column 7,
Line 51, delete "vent", insert -- event --.

Column 11,
Table 2, Instruction 12, delete "Set Queue Experiment", insert
-- Set_Queue_Experiment --.
Table 2, Instruction 13, delete "Set Bandwidth Experiment", insert
-- Set_Bandwidth_Experiment --.

Signed and Sealed this

Seventeenth Day of December, 2002

JAMES E. ROGAN
*Director of the United States Patent and Trademark Office*